(12) United States Patent
Berstis

(10) Patent No.: US 7,010,498 B1
(45) Date of Patent: Mar. 7, 2006

(54) PERSONAL PRODUCT LOCATOR ON STORE-OWNED SHOPPING AID

(75) Inventor: Viktors Berstis, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 679 days.

(21) Appl. No.: 09/404,398

(22) Filed: Sep. 23, 1999

(51) Int. Cl.
*G06F 17/60* (2006.01)

(52) U.S. Cl. ........................................ 705/14
(58) Field of Classification Search .................. 705/14
See application file for complete search history.

(56) References Cited

U.S. PATENT DOCUMENTS

| | | | |
|---|---|---|---|
| 4,882,724 A | | 11/1989 | Vela et al. |
| 4,962,466 A | * | 10/1990 | Revesz et al. .............. 705/14 |
| 5,185,695 A | | 2/1993 | Pruchnicki |
| 5,287,181 A | | 2/1994 | Holman |
| 5,295,064 A | | 3/1994 | Malec et al. |
| 5,420,606 A | | 5/1995 | Begum et al. |
| 5,572,653 A | | 11/1996 | DeTemple et al. |
| 5,806,044 A | | 9/1998 | Powell |
| 5,832,457 A | | 11/1998 | O'Brien et al. |
| 5,855,007 A | | 12/1998 | Jovicic et al. |
| 5,903,874 A | | 5/1999 | Leonard et al. |
| 5,905,246 A | | 5/1999 | Fajkowski |
| 5,907,830 A | | 5/1999 | Engel et al. |
| 6,041,309 A | | 3/2000 | Laor |
| 6,123,259 A | * | 9/2000 | Ogasawara .................. 235/380 |
| 6,129,276 A | * | 10/2000 | Jelen et al. .................. 235/383 |
| 6,177,880 B1 | | 1/2001 | Begum |
| 6,314,406 B1 | | 11/2001 | O'Hagan et al. |
| 6,330,543 B1 | | 12/2001 | Kepecs |
| 6,336,098 B1 | | 1/2002 | Fortenberry et al. |
| 6,336,099 B1 | | 1/2002 | Barnett et al. |

FOREIGN PATENT DOCUMENTS

| | | |
|---|---|---|
| EP | 0-034-859 | 9/1981 |
| EP | 000750240 A1 * | 1/1996 |
| EP | 0-788-248 A2 | 8/1997 |
| WO | WO 89/03555 | 4/1989 |
| WO | WO 95/19055 | 7/1995 |
| WO | WO 97/23838 | 7/1997 |
| WO | WO 98/21713 | 5/1998 |
| WO | WO 99/12116 | 3/1999 |

OTHER PUBLICATIONS

'The Gate Group', Executone Unveils 'Network ILS' Strategy, Feb. 23, 1998, The Gale Group, PR Newswire pages.*

* cited by examiner

*Primary Examiner*—Arthur Duran
(74) *Attorney, Agent, or Firm*—David A. Mims, Jr.; Dillon & Yudell LLP

(57) ABSTRACT

A method for providing a location of products to a customer in a retail environment. A product locator unit is attached to a shopping aid utilized within the retail environment. The product locator unit has an access point for entering a customer ID, a signalling mechanism for alerting the customer to a location of a desired product, and a program algorithm for correctly identifying the desired product. A user specifies a desired product which has been linked to the user's customer ID. A signal is transmitted with the product information and location within the retail environment. The signal is received by the product locator unit and the products are compared to the desired products to determine a match and subsequent location of said desired products. The customer is then alerted to the location of the desired product via the signalling mechanism.

22 Claims, 5 Drawing Sheets

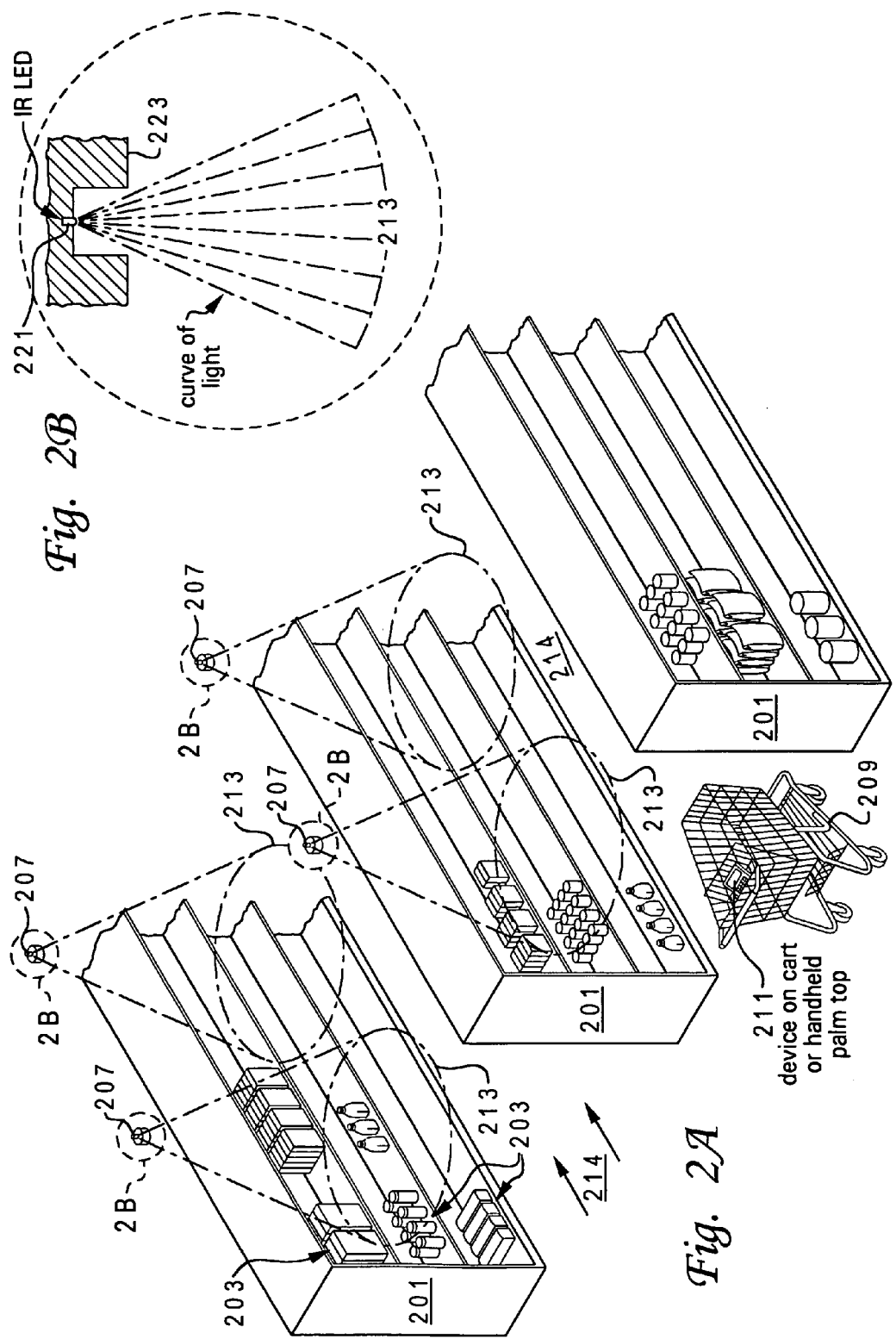

PERSONAL PRODUCT LOCATOR ON STORE-OWNED SHOPPING AID

CROSS-REFERENCE TO RELATED PATENT APPLICATIONS

The present invention is related to the subject matter of co-pending United States Patent Applications entitled "Electronic Redeeming of Coupons and Product Discounts Utilizing a Networked Products Database," filed Sep. 23, 1999, Ser. No. 09/404,405, "Method for Conveying a Location of a Product Within a Defined (Retail) Environment," filed Sep. 23, 1999, Ser. No. 09/404,407, "Personal Shopping Tool for Aiding in Product Location and Discount Redemption," filed Sep. 23, 1999, Ser. No. 09/404,272, "Method and System for Identifying a Location of a Product in a Retail Environment," filed Sep. 23, 1999, Ser. No. 09/404,406, assigned to the assignee herein named. The contents of the above-mentioned co-pending patent applications are incorporated by reference herein.

BACKGROUND OF THE INVENTION

1. Technical Field

The present invention relates in general to the purchase of discounted products, and in particular to a method and system for efficiently utilizing coupons for the purchase of products. Still more particularly, the present invention relates an electronic, computerized coupon redeeming method and system for utilization during purchasing of products.

2. Description of the Related Art

Redeemable coupons, such as merchandise coupons and rebate coupons, are frequently utilized to entice consumers to purchase particular products and/or brands of products. Advertisers constantly issue or publish printed coupons which can be taken to a redemption center, such as a retail store, and redeemed for some value or as a discount toward the purchase of some item. While this method has proven to be effective, there are many disadvantages to the process for the user, for the redemption center or retail store, as well as for the advertisers themselves.

The problems associated with clipping coupons by a user are manifold. First, a user must purchase or otherwise obtain a publication and search through the publication for coupons which would be meaningful or useful to the user. The user must then cut out the coupons, being of various physical sizes, leaving a pile of scrap paper and holes in the pages of the publication. Some advertisers use handouts or flyers which, although making the searching job easier, leaves the problem of having to cut out the coupons. This tends to be an annoying task which results in a waste of valuable time. Being of different sizes and pertaining to different types of products, the user must separate the coupons into product categories and band the coupons together as best as he or she can. The user then has to store these bits of paper in some location. When finally on his way to shop, the user stuffs these sorted coupons into a pocket or purse. Upon arrival at a particular retail outlet at which at least some of the coupons are redeemable, the user fumbles through the groups of coupons and attempts to find the products in the store. In the event that the user is not familiar with the layout of the store, this again constitutes a gross misuse of valuable time. Furthermore, since each store lays out their products differently, and carries different products and brands of products, the user may find it necessary to search out the desirable item in a number of stores. Finally, upon gathering the product into the pushcart or basket, the user is faced with selecting the coupons for the products and presenting them to the store clerk or cashier.

This then leads to the next problem associated with coupon redemption, in that the store clerk must sort through the coupons, ensuring that they relate to the products being purchased and that the expiration dates are appropriate, and then enter the discount information in the computer (usually by a bar code scanner). This part of the redemption process takes valuable time away from the checkout clerk and irritates other people waiting in the checkout line. After the customer leaves, the retail store is still not relieved from further expenditure of valuable employee time, since the accumulated coupons in the retail store must now be sorted by manufacturer, tallied on a score sheet or in a computer or submitted to brokerage house, and sent off to the manufacturer for retail store reimbursement.

Several previous patents have attempted to create more efficient ways of handling coupons. Powell (U.S. Pat. No. 5,806,044) discloses a personal computer system which receives coupon information and translates them into a binary format before encoding them unto a portable customer card used at checkout in place of the paper coupons. Holman (U.S. Pat. No. 5,287,181) discloses an electronic coupon generating system which uses a television transmission signal along with a decoder and recorder to encode the coupon information on a magnetically striped card (such as an ID card) called the Q card which can be swiped though the card reader at the cash register.

One of the fastest growing areas of communications is the Internet or World Wide Web (WWW). The Internet is widely utilized in selling products through a fast growing E-commerce business. The World Wide Web (Web) is a graphic, interactive interface for the Internet (the term Internet is utilized interchangeably with Web throughout this specification). There are different computer program applications (web browser clients, referred hereinafter as web browser) on a data processing system connected to the web that are utilized to access servers connected to the Web. Today, most networks are connected to the Internet and have a home web page which can be opened/accessed by a web browser. A web page is a graphic display which is usually linked together and may be downloaded to a data processing system utilizing a web browser. Each web page has a unique address, or Universal Resource Locator (URL) within the Web that is accessible by utilizing Transfer Control Protocol/Internet Protocol (TCP/IP) transactions via telecommunication networks and a modem. The address allows a web browser to connect to and communicate with a HyperText Transfer Protocol (HTTP) server over the Web.

The fast growing web activity has led many companies to advertise products on the Internet. However, most companies which are engaged in the retail business still spend lots of their resources on the paper coupon system described above. There is presently no way to effectively provide coupons via the web which a user can select without having to print the coupon off the site and go through the time consuming process described above.

The present invention recognizes that it would therefore be advantageous to have a method and system for utilizing the web to more efficiently distribute redeemable coupons. It would also be advantageous if such a method and system allowed a user to select and store desired coupons electronically via the web. It would be further advantageous to have a method and system which could help a customer to locate products for which the customer has electronically redeemable coupons.

SUMMARY OF THE INVENTION

It is therefore one object of the present invention to provide an improved method and system for purchasing discounted products.

It is another object of the present invention to provide a method and system for efficiently utilizing coupons for purchasing products.

It is yet another object of the present invention to provide an electronic, computerized coupon redeeming method and system for utilization during purchasing of products.

The foregoing objects are achieved as is now described. A method is disclosed for creating an electronic database of shopping products with electronically redeemable discounted information or coupons. Customers are each provided with a customer account linked to a customer identification (ID) which are also stored electronically. Desired products and/or coupons are selected by a customer from the database and stored in the customer's account prior to shopping for the product. The customer account is connected with and accessible from the retail store by the customer ID. Participating retail stores provide a mechanism for easily locating the discounted/couponed products when the customer is shopping. Finally, the check-out system of the retail store allows the stored electronic coupons to be redeemed by the customer using his customer ID.

In one embodiment of the invention, the universal products code (UPC) or other identifying information of the products is projected into an area of a controlled environment in which a customer travels. The transmitter utilized is a recessed, modified infra-red (IR) light emitting diode (LED). The modified IR light is utilized to indicate a location of products in the area of the projection. In this embodiment, the customer is provided with a portable mechanism which receives and deciphers the modified IR light and signals to him that the desired product is located in the area as the customer approaches.

In another embodiment, the customer's personal ID is utilized to activate a shopping tool such as a IR receiver on a shopping cart. The personal ID is stored on an ID card which is swiped through a card reader connected to the IR receiver. The IR receiver is able to recognize the modified IR signals containing UPC and other information and identify a location of a desired product.

In still another embodiment, the customer has a portable reader such as a palmtop computer which recognizes the transmitted, modified IR signal having digitized product information and initiates a check of its memory for a match with the desired products when it encounters the modified IR signal. The portable reader then alerts the customer of the location of the product.

In a final embodiment, the controlled environment is provided with a customer accessible product locator. The product locator may be a data processing system connected to the database of products and corresponding product location. The customer enters his unique ID and is provided with a visual output of the desired products and their specific locations.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 2A is a diagram depicting a shopping cart with a IR receiver travelling in a retail environment with modified light emitting diodes (LED) according the one of the preferred embodiment of the present invention;

FIG. 2B is a diagram illustrating a side view of a recessed LED in accordance with one embodiment of the present invention;

DETAILED DESCRIPTION OF ILLUSTRATIVE EMBODIMENT

Figure 1A:
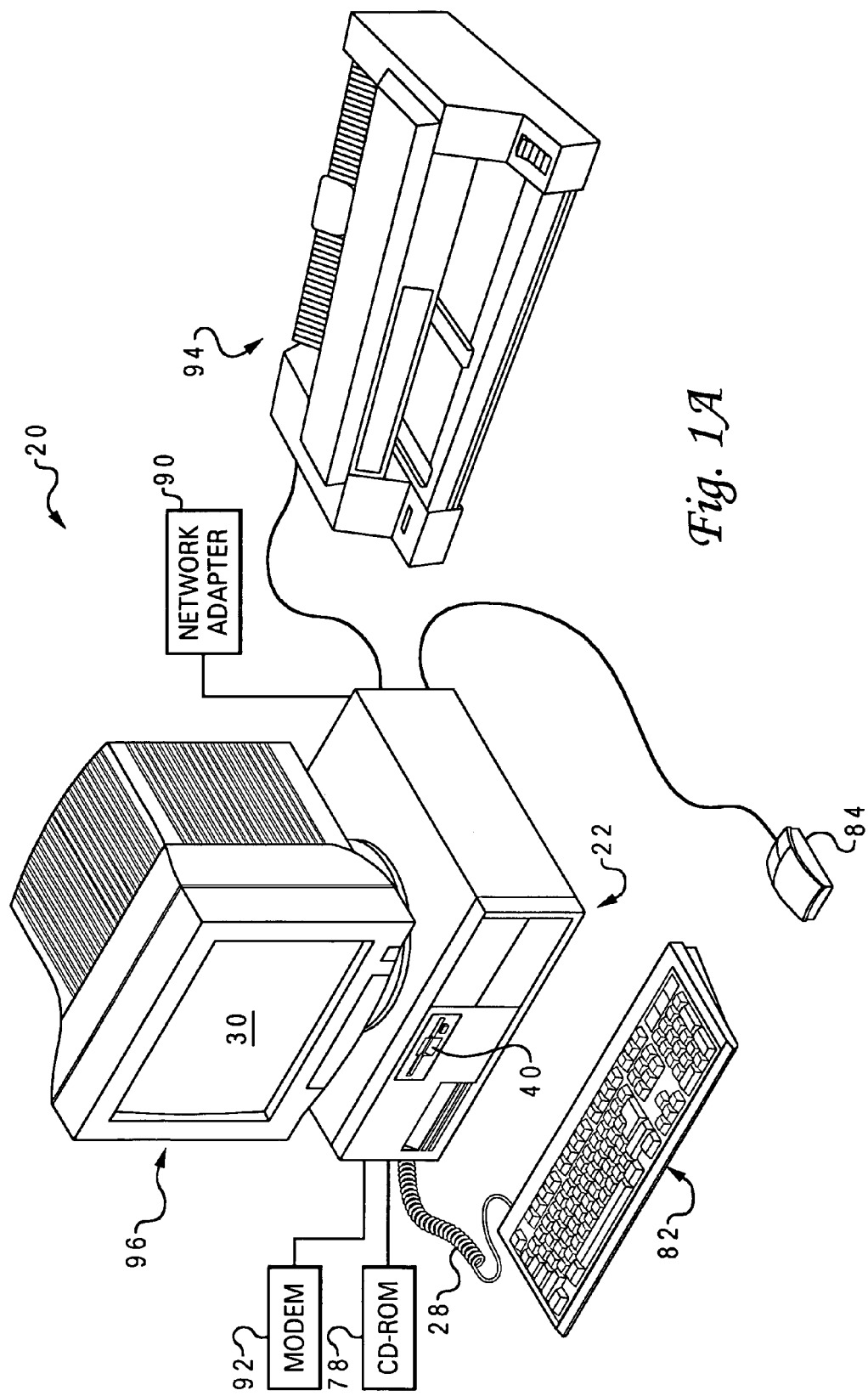
FIG. 1A is a diagram of a data processing system utilized to implement a preferred embodiment of the present invention.

With reference now to the figures, and in particular with reference to FIG. 1A, there is depicted the basic structure of a data processing system 20 utilized in the preferred embodiment of the invention. Data processing system 20 has at least one central processing unit (CPU) or processor housed in casing 22. CPU is connected to several peripheral devices, including input/output devices such as a display monitor 96, keyboard 82, graphical pointing device 84, and printer 94 for user interface. Also housed in casing 22 are a permanent memory device (such as a hard disk) for storing the data processing system's operating system and user programs/applications, and a temporary memory device (such as random access memory or RAM) that is utilized by CPU to implement program instructions. CPU communicates with the peripheral devices by various means, including a bus or a direct channel (more than one bus may be provided utilizing a bus bridge).

Data processing system 20 may have many additional components which are not shown such as serial, parallel, and USB ports for connection to, e.g., modems 92 or CD ROM 78. In the preferred embodiment of the invention, communication to the data processing system 20 is made possible via a modem 92 connected to a land line or wireless cellular telephone system which is in turn connected to a local network provider such as an Internet Service Provider (ISP). Additionally, data processing system 20 may be connected to a network via an ethernet/network card or adapter 90. Communicated data arrives at the modem or network card and is processed to be received by the data processing system's CPU or other software application.

Those skilled in the art will further appreciate that there are other components that might be utilized in conjunction with those shown in the block diagram of FIG. 1A; for example, a display adapter connected to processor might be utilized to control a video display monitor 30, and a memory controller may be utilized as an interface between temporary memory device and CPU. Data processing system 20 also includes firmware whose primary purpose is to seek out and load an operating system from one of the peripherals (usually permanent memory device) whenever the data processing system is first turned on. In the preferred embodiment, data processing system contains a relatively fast CPU along with sufficiently large temporary memory device and space on permanent memory device, and other required hardware components.

Conventional data processing systems often employ a graphical user interface (GUI) to present information to the user. The GUI is created by software that is loaded on the data processing system, specifically, the data processing system's operating system acting in conjunction with application programs. Two well-known GUIs include OS/2 (a trademark of International Business Machines Corp.) and Windows (a trademark of Microsoft Corp.).

Modem 92 can be utilized to connect data processing system 20 to an on-line information service or an Internet service provider. Such service providers may offer software that can be downloaded into data processing system 20 via modem 92. Modem 92 may also provide a connection to other sources of software, such as a server, an electronic bulletin board (BBS), or the Internet (including the World Wide Web).

The implementation of the present invention occurs on a number of data processing systems as described above. It is understood however, that other types of data processing systems are possible, which may have some or more of the basic components described above. In one embodiment, portable data processing systems are utilized during the locating of products as will be described below. These portable systems may include palmtops and laptops.

This invention has three major components: First, it allows users/customers to establish a discount for a product, set of products, or a brand of products as a result of some computer activity. Second, it assists customers in locating discounted products when shopping. Third, it permits electronic redemption of coupons for products purchased. For clarity, the disclosure is divided up into these major components which are presented as: A. Web-based, computerized coupon network database; B. Product locating system within a retail environment; and C. Electronic redemption of products and discounts.

A. Web based Computerized Coupon Network Database.

In a preferred embodiment of the web based coupon system, a database of products and coupons are made available on-line via the Internet at the web site of a particular retail store, (for example, HEB, Albertsons, Randalls), the manufacturer's web site, or the product/brand web page. Typically, retail stores operate as a chain of stores and offer the same coupons regionally or nationally. They are also often interconnected via a computer network. The computer network within which the preferred embodiment may be implemented is illustrated in FIG. 1B.

Figure 1B:
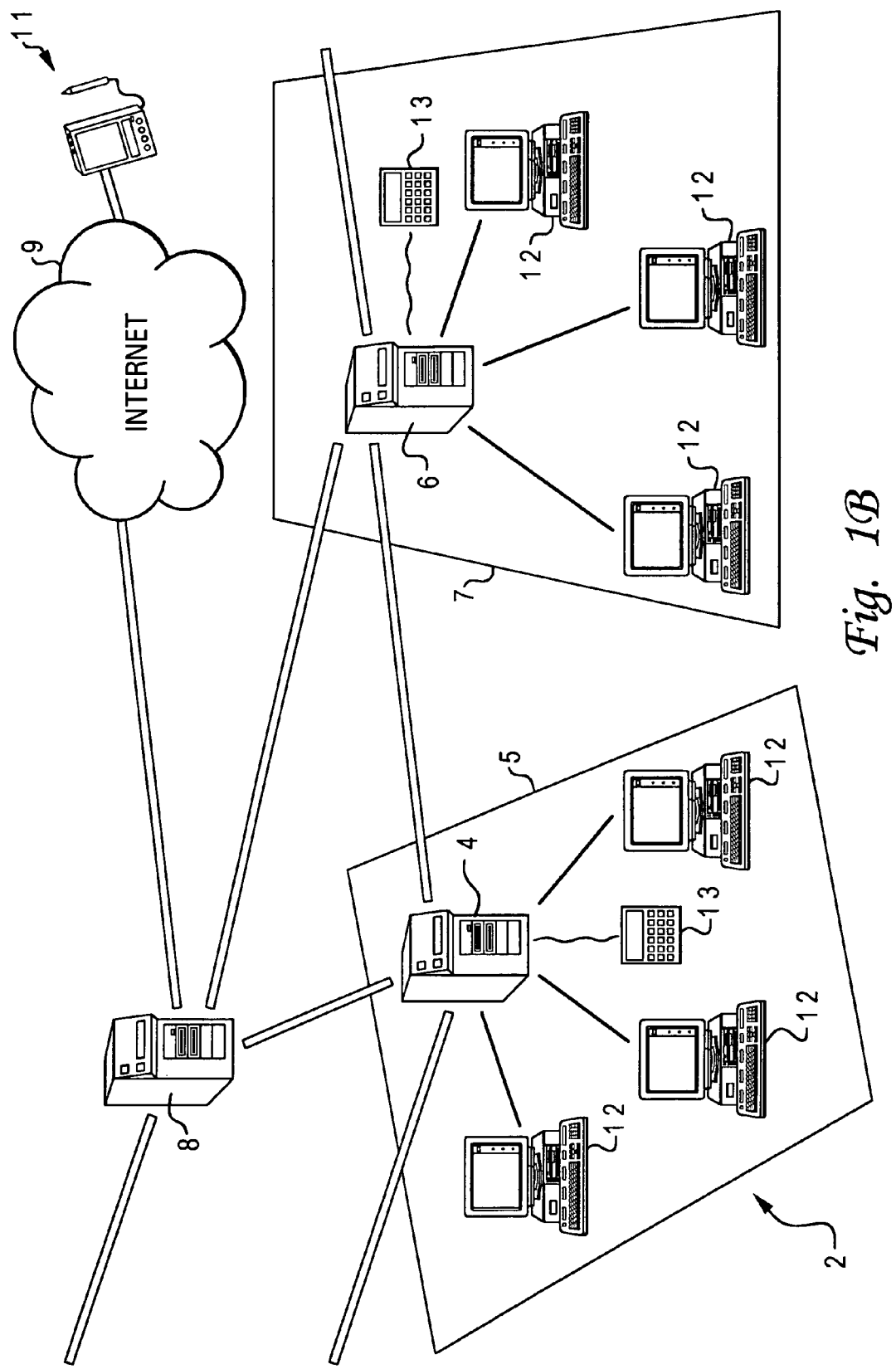
FIG. 1B is a diagram of a network of computers with an Internet linked server in accordance with a preferred embodiment of the present invention.

FIG. 1B is comprised of a plurality of network servers 4, 6, and 8 and individual client computers 12. One main network server 8 operates as the memory storage location for the database of products, customer ID and coupon/discount information utilized within the invention. Main network server 8 may exist at the product manufacturing site (i.e., the brand's merchandising department) where coupon information is entered into the database for use within the invention. Alternatively, main network server 8 may exist at one of the server locations such as a store or retail outlet.

Those skilled in the art are familiar with networked outlet chains such as HEB and Target, etc. which have interlinked network computers. Local servers 4 and 6 are located within the store areas 5 and 7, respectively, in which the customers shop. Store areas contain client computers 12 which are preferably computerized cash registers equipped with a UPC scanner and customer ID recognition unit (reader) (which may be the same as the scanner) for accessing customer's discount/coupon information from database on main network server 8. Also depicted in FIG. 1A is a locator unit 13 which is interlinked with main network server 8. Locator unit 13 is utilized by a customer for locating within the retail environment as will be discussed later.

As illustrated, main network server 8 is connected to the Internet 9 which displays to a web browser application the web page of the corporation (store chain or brand manufacturer) stored on main network server 8. A user of a web browser application can thus access the database of products utilizing his customer ID as described above. Web browser application may exist on a desktop computer as depicted in FIG. 1A; however, in one preferred embodiment, web browser applications exist on a portable handheld (palmtop) computer such as the Palm Pilot (manufactured by 3 Com) which has Internet access capability. The portability of this system is important to the description of one of the preferred embodiments of the invention discussed later.

In a non-web based application of the invention; the computer network may be a local area network (LAN). The LAN is then equipped with a login phone number and affiliated login ID to allow for remote login to the system and database.

In one embodiment of the invention, the customer computer has external connection points such as an application programming interface (API) which permit a small handheld scanner to be plugged into the system. This small handheld UPC/coupon code scanner may then be used to scan the UPC or other coupon information from a paper coupon as found in the Sunday newspaper or store coupon circular. The coupon information is then stored on the local system (if a portable handheld system) or stored in the customer account on the main network server 8 or local network server 4 or 6. Thus, the coupon is electronically tied to the customer ID number and utilized as described below. Alternatively, the customer may type in the coupon codes, eliminating the need to purchase a special scanner.

Main network server 8 may store customer information at local servers 4, 6 based on the geographical information entered by the customer. This relieves the mass storage requirement on main network server 8.

In a preferred embodiment, a user enters the web site via his home-based system and enters his customer ID. The customer ID is an identifying set of alphanumeric characters which specifically identifies a user. The ID may be obtained on-line or in-store or by mail request, etc. In one embodiment, the ID is issued via a swipe card which is mailed to the customer or given to the customer in the retail environment. The database is a storage location (memory) which stores product information including coupons information, etc. In one embodiment, the database also stores all customer IDs and corresponding customer account information. Once the user accesses the web site, he may select particular products and request the coupon discount (either by clicking on the visually displayed coupon or entering coupon information from the paper coupon obtained from the store or newspaper, etc. Alternatively, the web site is interactive and immediately provides information on all applicable discounts or coupons available when the customer enters the product identifying information (name, brand, etc.). Selections made by a customer are stored in the customer's account for the time period until the expiration of the coupon discount. Limits may be enforced to prevent a user from overloading his account or stockpiling coupons in his account.

In a preferred embodiment, the product information stored in the customer account may be stored in a temporary file or permanent file. Products which are desired only once are stored in the temporary file. Other products which a customer purchases on a repeat basis are placed in a permanent file. After selection of a product or discount, the user is prompted to select whether he wishes the product to be stored permanently. The user may then choose the product to be a regular item to be purchased more than once. The functionality and use of this method of storage will become more obvious below in section C of the disclosure.

In another embodiment, utilizing a manufacturer-based system (i.e., not retail store system), the web activity includes visiting the product/brand web pages, filling in survey information, or supplying ISP information so that the brand can send further advertisements to the user to be inserted at select times during web activity. In exchange, the user is given an internet based discount for the products or brand. Additionally, the customer may be requested to fill out a survey or questionnaire, which when answered results in the issuance of a virtual coupon, which can be placed in the customer account by filling in the customer ID.

In a preferred embodiment, an ID card is required to identify the user in the procedure. A smart card would be most ideal, but in the absence of smart cards, other alternatives are workable. For example, a customer's credit card number can be used (perhaps without the expiration date) or a grocery store discount card. When filling in the information at the store or brand's web site, the customer could supply his credit card number or grocery store discount card number as his ID. Geographic information for the user would also be requested. The set of ID numbers for a given geographical location can be cached locally for quicker access during checkout. Most optimally, ID's or downloaded ID files which are linked to a particular geographic area and selected products would be stored locally in the store's computer, which is in turn connected to all of the checkout registers.

Two methods of storing the client-based information is disclosed. The first utilizes the database of the retail store. However, with the large number of clients for chain retail stores, this could prove to be a very expensive enterprise requiring extensive amounts of memory storage area. In one embodiment, this could be relieved by having the customer select a particular geographic location. Each smaller size location is then outfitted with its own database of customer accounts interconnected with other databases to allow for roaming by a customer (i.e., shopping outside of his geographical area).

In one embodiment, a small hand-held/portable data processing system is utilized. This system may be a palmtop computer or similar portable mini-computer system with Internet capabilities. A user could easily log on to the Internet, get his desired discount coupons, download and store them on the palmtop computer prior to heading off to the store.

In the second method of storing user information on a database, a means of accessing the user account is also required. In the preferred embodiment, the user is again provided with an ID card which contains his alphanumeric ID. The ID card may be an ID card having a magnetic strip which could easily be swiped through a card reader (locator unit) connected electronically to the database storing the customer account as illustrated in FIG. 1B. One method of establishing access through said readers is through connecting the database to a network of computers such as a LAN which has terminals at the store locations. These terminals could be the cashier registers equipped with specialized software for accessing the database. Use of card readers are known in the art and are currently utilized in retail establishments. However, the invention extends the functionality by linking the customer ID to a stored customer account containing the discounted products. The card readers may be located at other locations within the store to enable customers to locate the required products. This aspect is discussed within section B below.

B. Product Locating in a System Retail Environment.

FIG. 2A depicts a shelf 201 in a retail establishment having products stored on a series of shelves 203. Shelf unit 201 may be one side of an aisle 214 or a back wall in a store. Located at specific intervals above the aisle 214 of along shelf unit 201 are a number of recessed Infra-red (IR) light emitting diodes (LED) 221. IR LEDs 221 emits infra red light modulated with digital signal, which conveys the UPC code, price, applicable coupon/discount information and other data of products stored on the shelf in that area. Modulating of the LED signal is handled by a data processing system which converts known product information to a digital format which may then be linked to and emitted along with the IR light. Changes to the database results in corresponding changes to the modulated signal. This process is preferably controlled by a system manager to ensure accurate broadcasting of product locations.

FIG. 2B displays the UPC emitter as a recessed Infra-red (IR) light emitting diode (LED) 221 in the roof 223. The recessed IR LED 221 produces a cone shaped IR signal which projects to the ground below IR LED 221. The IR signal falls on a circular area 213 of aisle 214 in front of shelf unit 201. In a preferred embodiment, IR LED 221 is recessed so that the projected IR signal does not intersect with the signal of a neighboring IR LED 221. IR LED 221 is preferably placed in the light fixtures of the retail store. Although the IR signal area on the ground is described as a circular area, it is understood that the signal may be configured to project in a different shaped area, such as a rectangular area.

Additional embodiments which use the modified IR signal in a retail environment involves placing the IR LED in a drive up area of the retail environment. A customer with a portable IR receiver is alerted to the presence and/or location of desired products which have been pre-programmed into the portable IR receiver. Depending on the strength of the IR signal, customers may be alerted as they drive by on a street which runs through a circumferential diameter of the emitting IR LED signal. Although this feature has been described with reference to its application in a retail environment, use of the features of a modified IR signal may be applied to non-retail environments as well. For example, an IR LED may be placed within a stop-light and transmit address information. A person with a specialized, portable IR receiver may be provided the directions to a particular address which has been pre-programmed. In this environment, the IR receiver enables a portable address locator.

Returning to FIG. 2A, a customized shopping aid 209 such as a shopping cart or basket is utilized by a customer to assist the customer in transporting items/products selected during shopping. In one embodiment, customized shopping aid 209 has an IR receiver 211 affixed to it, which receives IR signal modulated with UPC codes of the products off the shelves 203 in the specific broadcast area of the IR signal. IR receiver is a part of a product locator unit which is connected to the database. It is also referred to herein as the portable unit of the product locator unit. Located either locally on the cart or remotely in another area of the retail environment is the base unit of the product locator unit. The base unit is coupled directly or indirectly to the portable unit depending on its location. The product locator unit is activated by providing it with a customer ID to which preselected/desired product information is linked. The customer identifies himself to the IR receiver unit 211 attached to the shopping cart by sliding through his swipe ID card, which may be his credit card. The ID is used to access the database and determine which products the customer should be notified about.

In one embodiment, the IR receiver 211 is connected via a wireless connection to the base unit which is connected to the database holding the customer account so as to quickly access the customer coupon information. The IR receiver also has an output mechanism for identifying to the customer which product has been matched along with its price discount information and location. While passing in circular area 213, the IR receiver 211 picks up the emitted IR signals. A comparison of the products identified from the emitted IR signals is made to the list of customer's desired products at the base unit. The comparison may also search for products for which the customer has selected a coupon discount (or the customers' grocery list). When a desired product information is found within the emitted IR signal, the user of the shopping aid is alerted to the presence of the product. The IR receiver 211 alerts the customer of the presence either audibly (such as via a beep) or visually (on a display monitor of by print-out). IR receiver 211 may be a combination device which incorporates a scanner functionality with which information about a product (e.g. price) is read while shopping.

In an alternate embodiment, the customized shopping aids are given specific tags by which they may be electronically identified. The customized shopping aids are then placed in an electronically monitored area. The monitored area has a ID card reader connected to the retail store's computers. If a customer wishes to use a cart, he must first swipe his ID card through the reader or enter his ID information into a punch pad connected to the reader. This links the particular cart (via its tag) to the particular customer ID. In this embodiment, the product location information is made available via a locator unit at each aisle or at the entrance to the retail environment. The customer again enters his customer ID and is provided with a print-out or visual display of the desired products, their location in the retail store and other information. This allows the customer to quickly locate the desired products. When the customer brings the shopping aid to the cash register, the tag is read automatically by a reader at the cash register. The computer is able to identify the customer by the customer ID linked to the tag and apply the applicable coupons/discounts to products purchased.

In a preferred embodiment, a palmtop computer is utilized in place of the product locator unit. The palmtop computer is utilized to store the list of customers items (shopping list) and electronic coupon/discounts. This element utilizes the functionality of the palmtop computer which operates as a data processor having memory for storing a customer's product information. During stage A of the invention, the palmtop computer is hooked up to the Internet and the electronic coupons are downloaded as previously described. Alternatively, the coupons may be manually entered or scanned in using input devices of the palmtop. Additionally, other product information, such as a customer's grocery list, may be stored on the palmtop computer. The palmtop computer utilizes its IR port to detect the modulated IR signal. The palmtop computer is programmed to compare the information received from the modulated IR signal against the list of pre-stored customer product information. If the comparison results in a match of a product, then the product and applicable price and discount is displayed on the palmtop computers display screen. The customer is therefore alerted to the presence of the particular product on a nearby shelf or product area and provided all relevant pricing and discount information simultaneously. Typically, palmtop computers are customer owned devices.

Returning to FIG. 2, a more specific example is now provided. For this example it is assumed that the customer obtains a coupon for product A which has a 20% discount. The customer enters the coupon information on-line via the Internet by accessing the stores web site with his customer ID. The product coupon is stored either in the main server database or in the local server database based on the geographical information entered by the customer. When the customer goes to the store, he collects a basket with an IR receiver (or tag) attached. The customer slides his smart card through a slide area on the IR receiver or manually enters the ID information on a punch pad of the IR receiver. This automatically triggers a wireless connection to the database and the customer's desired product and coupon information is retrieved. The IR emitter 207 emits the modified IR signal with the UPC codes for all the products in its area (A, B, C, and D). When the customer pushes the basket in the area 213 of the emitted beam, the IR receiver picks up the UPC codes of the products and forwards it to the database for a comparison. The database checking algorithm checks all four products against the customer product and coupon information and returns with a match for product A with a 20% coupon discount. This information is relayed to the customer via an audible signal or visual display on the IR receiver. When the customer goes to the check out counter (cashiers) he swipes his card in the card reader or enters his customer ID on a punch pad. The cashier machine has an internal computer linked to the database which automatically gives the customer a 20% discount on product A. The print out of the receipt displays this discount and a sum total of the savings based on the coupon redemption.

In another embodiment of the invention, each aisle is provided with a monitor unit having a swipe area or punch pad. The customer goes to the monitor unit and enters his customer ID via one of the two input methods. This triggers the search for matching products among the products on either side of the aisle. When a match is found, a printout or visual display of the desires products and applicable discounts are presented to the customer on the monitor along with the price, location in the aisle, discount, etc. In this embodiment, an electronic record of the location of all the products on the aisles must also be provided, necessitating access to a database or memory storage location.

Figure 3:
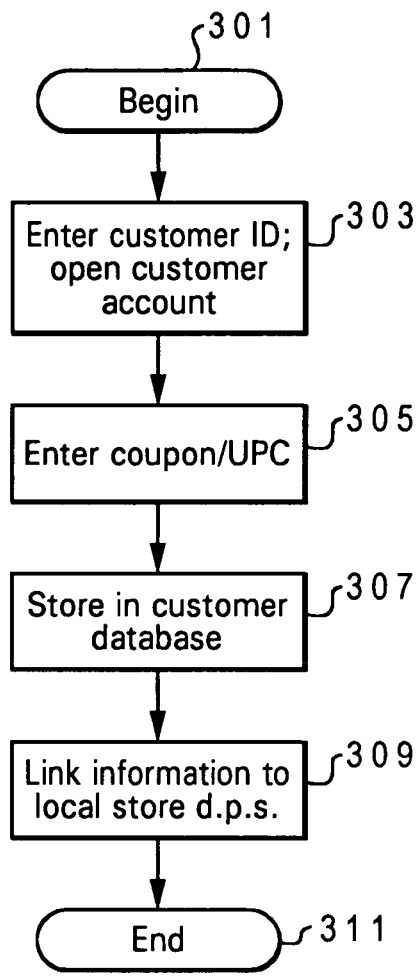
FIG. 3 is a logic flow chart of the process of storing redeemable coupon information in the customer's account on the web site of the manufacturer or retail store in accordance with one embodiment the present invention.
Figure 4:
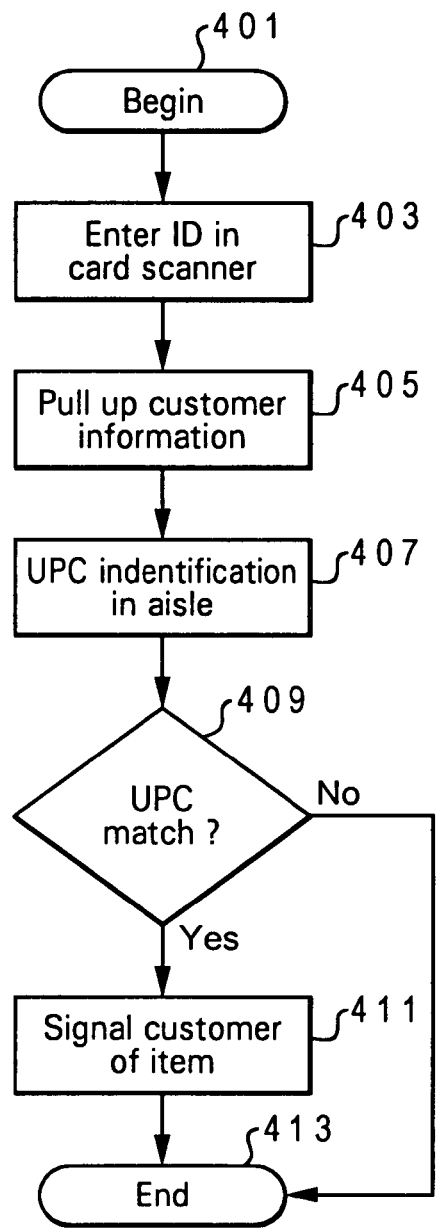
FIG. 4 is a logic flow chart of the process of finding desired products in a store utilizing a UPC emitter and portable reader device according to one embodiment of the present invention.
Figure 5:
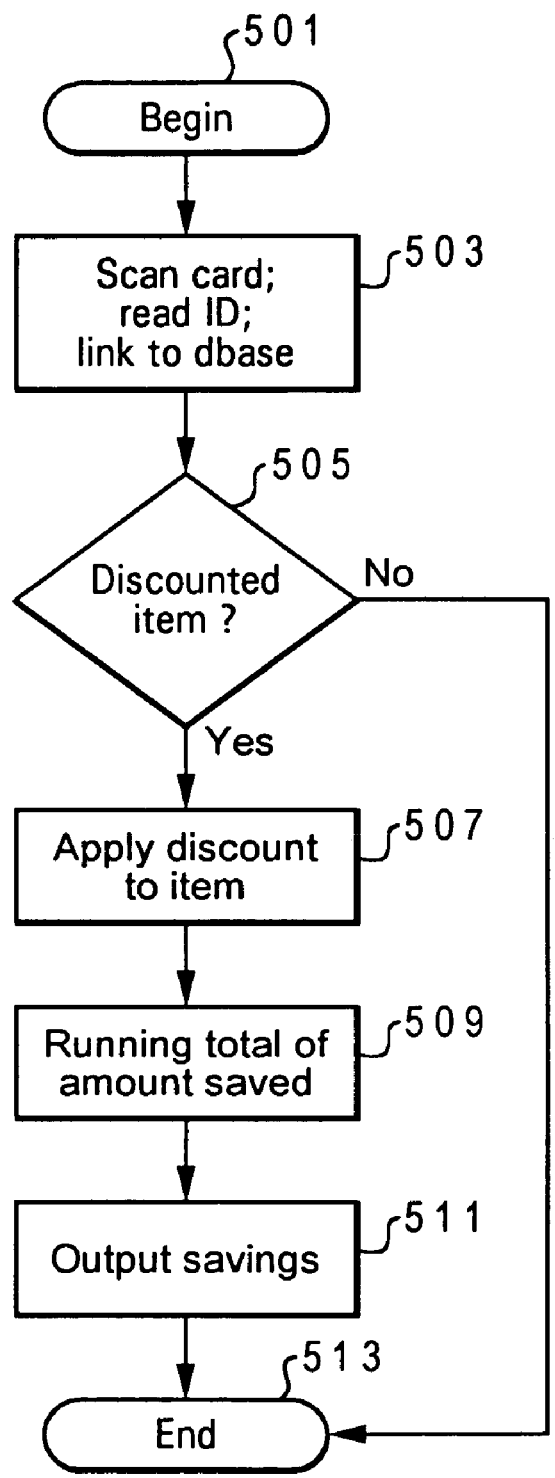
FIG. 5 is a logic flow chart of the process of customer check out at the cashier register utilizing electronic coupons according to one embodiment of the present invention.

FIGS. 3, 4 and 5 illustrate the various processes utilized in the implementation of the invention. FIG. 3 depicts the process of entering the coupon information. The process begins (step 301) when the user logs unto the web page of the store and enters his customer ID to open his customer account (step 303). The user then enters the coupon information (step 305). This step may be completed utilizing a punch/keypad or a scanner or another input device such as a microphone. Alternatively, the coupon information may be made available on-line requiring the customer to click on the relevant product and coupon. The coupon information is then stored in the customer account (step 307) on the server database which is linked to local store database/computer system (step 309). Then the process ends (step 311).

FIG. 4 depicts the process of locating the discounted products in the store. The process begins (step 401) when the customer enters his customer ID in the IR receiver (step 403). The customer account is accessed (step 405). An IR emitter transmits the UPC of the products on the shelves in the aisle. When the customer enters the area of the signal, the UPC is read and compared against the customer product and discount information for a match (step 409). If there is a match, then the customer receives a signal of the location of the item and other relevant information (step 411). Then the process ends (step 413).

C. Electronic Redemption of Products and Discounts

When the user checks out at the store, the cash register checks whether the user is entitled to a discount for the products as they are scanned in, and if so the reduced price is given, and at the end of the receipt, a statement is made that a certain dollar amount was saved by buying brand XXX products.

FIG. 5 depicts the process of checking out with discounted items. The process begins (step 501) when the customer ID is read accessing the customer account (step 503). The database runs an algorithm which determines if the item being scanned has an applicable coupon discount (step 505). If it is not discounted, then the process ends (step 513). If, however, the product has applicable coupon discount, then the discount is applied to the item (step 507) electronically. A running total of the amount saved is kept by the cashier computer (step 509). The total savings is outputted to the customer (step 511), then the process ends (step 513).

Various modifications of the check-out process are implemented depending on the product location method utilized. In the more general application in which no location information is required, a customer simply enters his customer ID during check-out of products. The applicable discount information is automatically applied from the database to his purchase.

In the embodiment utilizing a portable customer owned locator (i.e., the palmtop computer), the locator may be equipped with a signal transmitter which sends stored discount information to a cash register which is capable of receiving and deciphering the signals. The discounts are then automatically applied.

The implementation utilizing the tag or IR receiver on the shopping aid also operates similarly to the general application except that the customer ID is read off of the tag or the IR receiver by a reader on the cash register. The database if then accessed for the applicable discount information.

In the preferred embodiment, the database or portable device deletes the product and coupon/discount information from the database of customer selected products once it identifies a purchase of the product. However, products which are stored in a permanent file are not deleted. Thus, the list of products are automatically deleted from the customer ID at purchase only if they were stored in the temporary file.

This invention has several noticeable benefits. Utilizing the invention, a customer does not have to carry around coupons to remind himself which products are on sale. Also, he doesn't have to carry a scanner to see if a particular product qualifies for a discount and to find out what the price is when it is not marked. This allows a store to support a more dynamic and adaptive pricing structure.

Additional applications are possible with this invention. The brand manufacturer can now know which users actually bought their products instead of the traditional anonymous purchase with a coupon. Quantity limits can be electronically enforced. Additional discounts can be given when a given user purchases larger quantities. Stores may also offer product scanners that users can use while walking through the store. User are then alerted about items to which they are entitled to receive a discount.

The invention eliminates the need for paper handling of coupons. The coupon originator gets better information about customer response to the coupons and can better enforce limits to customers. Also, it allows for easier checking at the check-out counter and faster clearing of coupons since everything is completed electronically. The teller no longer has to scan each coupon individually.

While the invention has been particularly shown and described with reference to a preferred embodiment, it will be understood by those skilled in the art that various changes in form and detail may be made therein without departing from the spirit and scope of the invention.

What is claimed is:

1. A method for providing a location of products to a customer in a retail environment, said method comprising the steps of:

attaching a product locator unit to a shopping aid that is utilized within said retail environment, said product locator unit having an access point for entering a customer ID, a storage location for electronically storing a list of customer desired products, an infra red (IR) receiver that receives IR signals with localized product information at specific locations in which said IR signal is broadcasted, a program algorithm for comparing said localized product information with product identifiers (IDs) of said customer desired products, and, a signaling mechanism for alerting said customer to a location of a desired product, said location being identified by said received IR signal; and enabling in-shopping signaling to said customer of the presence of a desired product when said customer is in the vicinity of said desired product, wherein said signaling is completed responsive to a (1) receipt of an IR signal at a particular location by the IR receiver of the product locator unit; and (2) correct matching of the ID of said desired product with said localized product information within said IR signal received.

2. The method of claim 1, wherein said product locator unit in said attaching step comprises a base unit and a portable unit, said enabling step further comprising:

receiving product signals being projected within said retail environment utilizing a signal sensor of said portable unit; and transmitting said product signals back to said base unit, wherein said base unit completes the comparison of said product signals with said product IDs of said desired products; and signaling back to said portable unit when said comparing step results in a match, wherein said customer is immediately alerted via said portable unit of a location of said desired product.

3. The method of claim 1, further comprising:

enabling storage of electronic coupons along with said desired products within said product locator unit; and providing remote electronic redemption of coupons associated with said desired products during checkout at a checkout register by beaming said coupon information from said product locator to said checkout register when said desired product is scanned at said checkout register.

4. The method of claim 1, further comprising installing a signaling mechanism for projecting said digitized product information within particular areas of said retail environment.

5. The method of claim 1, wherein said enabling step includes the step of printing a report for said customer, said report including a list of desired products and their location.

6. The method of claim 2, wherein said portable unit has a tag which identifies the particular shopping aid, said enabling step includes the steps of:
   linking said tag to said customer ID following entry of said customer ID in said product locator unit; and
   remotely identifying said customer ID to a cash register when said tag is brought towards said cash register, thereby allowing for the application of product discounts associated with said desired products via said customer ID.

7. A system for providing a location of products to a customer in a retail environment, said system comprising:
   a product locator unit that is attachable to a shopping aid utilized within said retail environment, said product locator unit comprising:
      an access point for entering a customer ID;
      a storage location for storing a list of customer desired products;
      an infra red (IR) sensor that receives IR signals with digitized product identification information while said product locator unit is within a location in which said IR signal is being broadcasted;
      a program algorithm for deciphering said digitized product identification information and comparing said digitized product identification information with product IDs of said customer desired products for a match; and
      means for signaling to said customer that a desired product is within the vicinity of said customer when said program algorithm finds a match; and
   means for providing in-shopping product location and coupon redemption services to said customer utilizing said product locator unit, wherein said customer is alerted to the presence of a desired item when that desired item is in the vicinity of said customer.

8. The system of claim 7, wherein said product locator unit comprises a base unit and a portable unit, and further comprises:
   means for receiving product signals being projected within said retail environment utilizing a signal sensor of said portable unit; and
   means for transmitting said product signals back to said base unit, wherein said base unit completes the comparison of said product signals with said product IDs of said desired products; and
   means for signaling said portable unit when said comparing results in a match, wherein said customer is immediately alerted via said portable unit of a location of said desired product.

9. The system of claim 8, further comprising:
   means for storing electronic coupon information associated with said desired products;
   means for providing remote electronic redemption of coupons/discounts associated with said desired products during checkout at a checkout register by beaming said coupon/discount information from said product locator unit to said checkout register when said desired product is scanned at said checkout register.

10. The system of claim 7, further comprising an IR signaling mechanism for projecting product identification information within specific areas of said retail environment.

11. The system of claim 7, wherein said product locator unit further comprises a display screen for visually displaying a location of a desired product within the vicinity of said product locator unit.

12. The system of claim 7, further comprising means for printing a report for said customer, said report including a list of desired products and their location.

13. The system of claim 8, wherein said portable unit has a tag, which identifies the particular shopping aid, said system further comprising:
   means for linking said tag to said customer ID following entry of said customer ID in said product locator unit; and
   means for remotely identifying said customer ID to a cash register when said tag is brought towards said cash register, thereby allowing for the application of product discounts associated with said desired products via said customer ID.

14. A computer program product for providing a location of products to a customer in a retail environment, said computer program product comprising:
   a computer readable medium; and
   program instructions on said computer readable medium for:
      enabling a product locator unit attached to a shopping aid utilized within said retail environment to identify customer desired products located within a vicinity of the shopping aid, signal that said desired product is located in the vicinity, and remotely redeem electronic coupons for said desired product during checkout by beaming coupon data to a checkout register.

15. The computer program product of claim 14, wherein said product locator unit is comprised of a base unit and a portable unit, said program instructions further comprising program instructions for:
   receiving product signals being projected within said retail environment as input;
   encoding and transmitting said product signals back to said base unit;
   comparing said product signals with said desired products to determine a match;
   signaling back to said portable unit when said comparing step results in a match; and
   in response to said signaling step, alerting said customer via said portable unit of a location of said desired product.

16. The computer program product of claim 14, said product locator having an access point for entering a customer ID, a signaling mechanism for alerting said customer to a location of a desired product, and a program algorithm for correctly identifying said desired product, said program product further comprising program instructions for:
   receiving a list of user specified desired products, said desired product being linked to said customer ID;
   comparing said desired products to products found in particular locations of said retail environment to determine a location of said desired products; and
   signaling to said customer the location of said desired product via said signaling mechanism.

17. The computer program product of claim 14, wherein said program instructions further comprises program instructions for receiving a download of coupon data along with product IDs from a database upon entry of said customer ID.

18. The computer program product of claim 14, wherein said program instructions for said signalling step includes program instructions for visually displaying a location of a desired product on a display screen of said product locator unit.

19. The computer program product of claim 14, wherein said program instructions for said signalling step includes program instructions for printing a report for said customer, said report including a list of desired products and their location.

20. The method claim 1, wherein said enabling step comprises receiving a download of product IDs and associated electronic coupon data when said customer ID is entered into said product locator unit.

21. The system of claim 6, wherein said product locator unit further comprises means for receiving a download of product IDs and associated electronic coupon data when said customer ID is entered into said product locator unit.

22. A product locator unit for use within a retail environment, said unit comprising:
 connection means for connecting said unit to a shopping aid utilized within said retail environment;
 an access point for entering a customer ID;
 means for receiving data associated with an electronic list of customer desired products;
 a storage location for storing said electronic list of customer desired products;
 an infra red (IR) sensor that receives IR signals with digitized product identification information while said product locator unit is within a location in which said IR signal is being broadcasted;
 a program algorithm for deciphering said digitized product identification information and comparing said digitized product identification information with product IDs of said customer desired products for a match; and
 means for signaling to said customer that a desired product is within the vicinity of said customer when said program algorithm finds a match;
 means for receiving and storing electronic coupon information associated with said desired products;
 means for providing remote electronic redemption of coupons/discounts associated with said desired products during checkout at a checkout register by beaming said coupon/discount information from said product locator unit to said checkout register when said desired product is scanned at said checkout register.

* * * * *

Disclaimer

7,010,498 — Viktors Berstis, Austin, TX (US). PERSONAL PRODUCT LOCATOR ON STORE-OWNED SHOPPING AID. Patent dated March 7, 2006. Disclaimer October 06, 2006, by the assignee, International Business Machines Corporation.

Hereby disclaims all of the claims of said patent.

*(Official Gazette November 25, 2008)*